United States Patent
Rutherford

(10) Patent No.: US 8,276,831 B2
(45) Date of Patent: Oct. 2, 2012

(54) MOTOR VEHICLE HAVING BUILT-IN GENERATOR AND AIR COMPRESSOR

(75) Inventor: Keith D. Rutherford, Shreveport, LA (US)

(73) Assignee: Keith D. Rutherford, Bossier City, LA (US)

( * ) Notice: Subject to any disclaimer, the term of this patent is extended or adjusted under 35 U.S.C. 154(b) by 1300 days.

(21) Appl. No.: 12/008,412

(22) Filed: Jan. 11, 2008

(65) Prior Publication Data

US 2008/0170914 A1 Jul. 17, 2008

Related U.S. Application Data

(60) Provisional application No. 60/879,951, filed on Jan. 11, 2007.

(51) Int. Cl.
*B05B 1/24* (2006.01)
*B65G 53/18* (2006.01)

(52) U.S. Cl. ............ 239/172; 123/2; 406/42; 296/182.1; 180/53.1

(58) Field of Classification Search ........ 123/2; 406/42; 296/182.1; 180/53.1; 239/172
See application file for complete search history.

(56) References Cited

U.S. PATENT DOCUMENTS

| | | | | |
|---|---|---|---|---|
| 5,094,309 | A | * | 3/1992 | Vlaanderen et al. ......... 180/53.7 |
| 5,403,128 | A | * | 4/1995 | Thomas .......................... 406/39 |
| 5,463,992 | A | | 11/1995 | Swenson et al. .............. 123/198 |
| 5,669,842 | A | * | 9/1997 | Schmidt ............................ 475/5 |
| 6,446,731 | B1 | * | 9/2002 | Sorosky .......................... 169/24 |
| 6,666,385 | B1 | * | 12/2003 | Gonitzke et al. .............. 239/130 |
| 6,909,197 | B2 | | 6/2005 | Kaga et al. .................. 290/40 C |
| 6,991,041 | B2 | * | 1/2006 | Laskaris et al. ................. 169/14 |
| RE39,249 | E | * | 8/2006 | Link, Jr. ........................ 141/231 |
| 7,094,004 | B2 | | 8/2006 | Dunlop et al. .................. 406/68 |
| 7,254,943 | B2 | * | 8/2007 | Moller ............................ 60/359 |
| 7,264,178 | B1 | * | 9/2007 | Hugg ............................ 239/129 |
| 7,530,404 | B2 | * | 5/2009 | Lenz, Jr. ......................... 169/24 |
| 2006/0137924 | A1 | * | 6/2006 | Larson ......................... 180/65.2 |

* cited by examiner

*Primary Examiner* — Noah Kamen
*Assistant Examiner* — Grant Moubry
(74) *Attorney, Agent, or Firm* — Daniel J. Chalker; Chalker Flores, LLP

(57) ABSTRACT

A box truck for supplying sufficient electrical power and compressed air flow to enable spray foam contractors to use specialized equipment to foam insulate buildings. Such a truck has the necessary generator and air compressor systems mounted within the chassis of the vehicle and said systems do not take up valuable cargo space within the truck box, while utilizing components present in normal box truck designs to assist in their operation. The generator system is hydraulically powered and utilizes a PTO (Power Take-Off) mechanism to use power from the truck power train to drive the hydraulic system. The air compressor is a screw type compression system and is belt driven off the truck engine.

20 Claims, 6 Drawing Sheets

MOTOR VEHICLE HAVING BUILT-IN GENERATOR AND AIR COMPRESSOR

CROSS REFERENCE TO RELATED APPLICATIONS

This application claims the benefit of priority under 35 U.S.C. §119(e) of U.S. Provisional Application No. 60/879,951 filed on Jan. 11, 2007, the disclosure of which is incorporated herein by reference.

TECHNICAL FIELD

This invention relates to a motor vehicle configured for supplying sufficient electrical power and compressed air flow to enable spray foam contractors to use specialized equipment to foam insulate buildings.

BACKGROUND OF THE INVENTION

Spray foam polyurethane has become a popular form of building insulation. One such system, SEALECTION 500 spray foam insulation sold by Demilec (USA) LLC, is a semi-rigid thermoset polyurethane foam composed of millions of microscopic cells of which most are open.

The application of the product is done at the job site. To spray the foam to insulate a building according to existing practice, a truck containing the necessary special equipment is driven to the job site. Both a generator and an air compressor are needed. The foam spraying process components include a pair of tanks of reactants that are not mixed until the reactants reach the head of a spray gun at the job site, and a reactor mounted in the truck that controls reactant flow and temperature. An air drier is also mounted in the truck so that air from the air compressor that is used for spraying is as free of humidity as possible. Numerous pumps and heaters are needed, including specialized thermocouples built into the hoses that carry the reactants to the gun while maintaining the required elevated temperature. These components require electric power to operate. Compressed air is also supplied to the breathing system of the gun operator, who carries out the spraying process while wearing a sealed suit.

Box trucks currently in use mount self-powered generator and air compressor units inside the box (truck body) in a room or compartment provided for that purpose, occupying 3 to 4 feet of the box in the lengthwise direction. The other components needed to carry out the foam spraying process must then be placed in the remainder of the box, which needs to be larger for that purpose, or else carried on a trailer. There exists a need for a truck that does not require large portions of its box space to be taken up by systems necessary for the application of spray foam polyurethane. This invention addresses that need by permitting the use of a smaller truck and box, since all the components are mounted on the outside of the box except for the control unit. This allows for a more compact installation with a larger generator and air compressor.

SUMMARY OF THE INVENTION

A motor vehicle according to the invention is configured for carrying a spray foam insulation system that uses electrical power from a generator and compressed air. The vehicle includes a frame, a cab, a front engine compartment housing an engine which outputs rotary motion to a crankshaft, a drive shaft which propels wheels of the vehicle, a transmission which transmits rotary motion of the crankshaft to the drive shaft, and a rear body or box enclosure behind the cab configured for storing and carrying objects. An air compressor is mounted in the front engine compartment and connected by a belt and pulley to the crankshaft. A clutch and a first control system are provided for allowing the air compressor to be turned off and on while the engine is running A power take off is connected to the transmission, including a secondary drive shaft and a second control system for engaging and disengaging the power take off. A closed-loop hydraulic pump is connected to and operated by the secondary drive shaft. An electrical generator is connected to receive and be driven by hydraulic fluid flow from the hydraulic pump. A controller receives input indicating electrical power demand on the generator and connected to an actuator on the hydraulic pump, including programmed parameters for operating the hydraulic pump to match flow pressure of the hydraulic pump to the electrical power demand on the generator. Preferably the motor vehicle is a diesel box truck, and the hydraulic pump and generator are mounted to the vehicle frame underneath the rear box.

According to preferred embodiments of the invention, this system when operated at 1800 rpm will provide 58 cfm of air at about 150 psi. The compressor is a screw type air compressor allowing for a large volume of air at high pressure in a relatively small package. This compressor is belt driven off the truck engine and is mounted on the upper right side of the truck engine. It is necessary to add a crankshaft drive pulley and new idler to accommodate the belt to drive this compressor. The hoses are run from the compressor to the oil/air separator tank located under the driver's side step. The screw type compressor must use oil to lubricate the rotors while they are compressing the air. This gives a continuous smooth flow of compressed air. Since dry, clean air is needed for the tools used in the spray foam process, an air/oil separator and air drier treat the air before it is fed to a distribution manifold.

The vehicle has a power take off system that is connected to the transmission of the vehicle, which includes a secondary drive shaft and a second control system for engaging and disengaging the power take off. The secondary drive shaft engages and operates a closed-loop hydraulic pump which is connected to and drives an electrical generator by hydraulic fluid flow. The hydraulic pump and electrical generator are mounted to the vehicle frame underneath the rear box. A controller receives input indicating electrical power demand from the generator, and is connected to an actuator on the hydraulic pump, which possesses pre-programmed parameters for operating the hydraulic pump to match flow pressure of the hydraulic pump to the electrical power demand on the generator. These and other aspects of the invention are discussed in the detailed description that follows.

DETAILED DESCRIPTION

Figure 1:
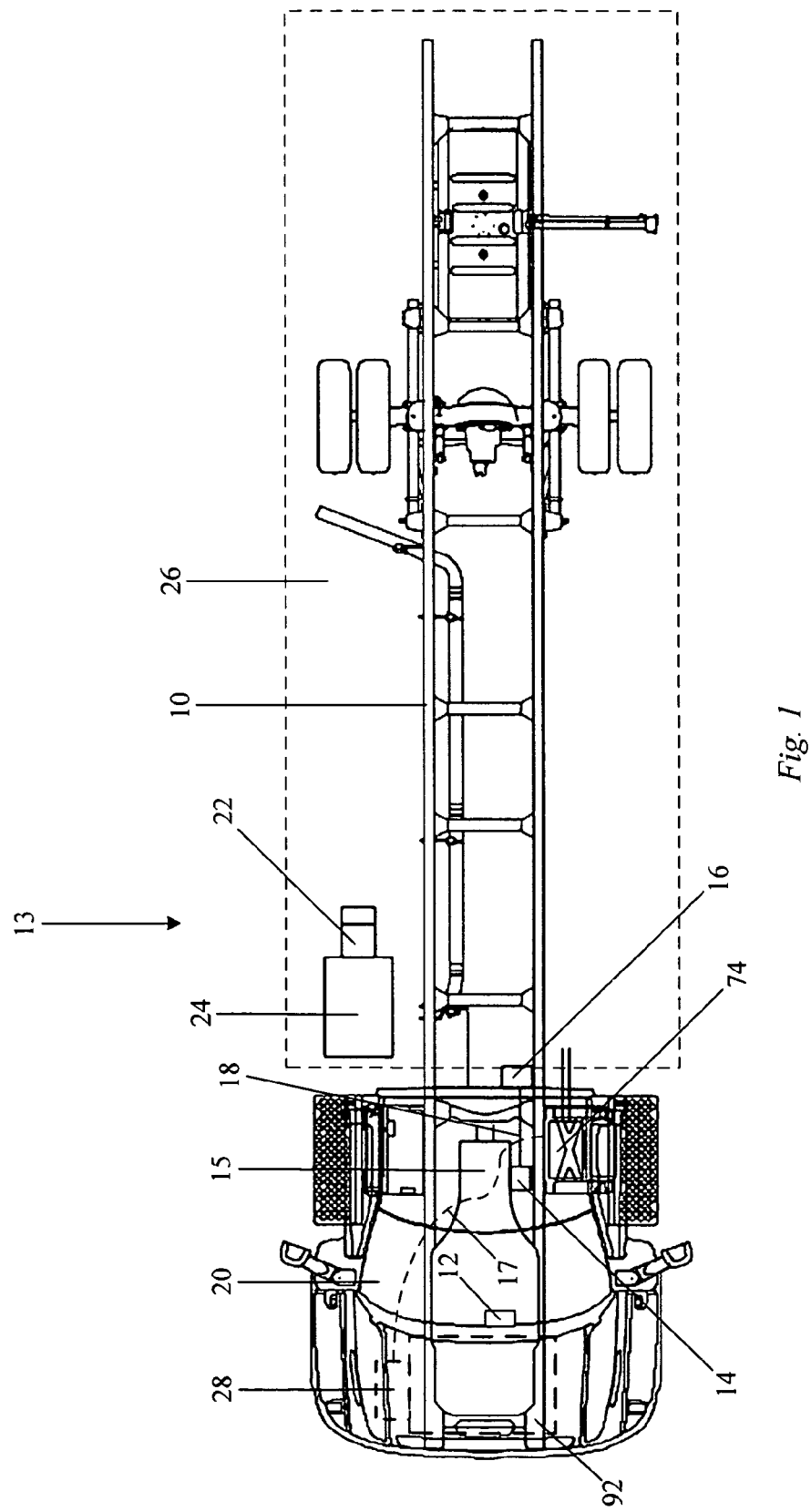
FIG. 1 is a top view showing the positions at which components according to the invention are mounted on the truck frame (box and other truck features omitted.)
Figure 2:
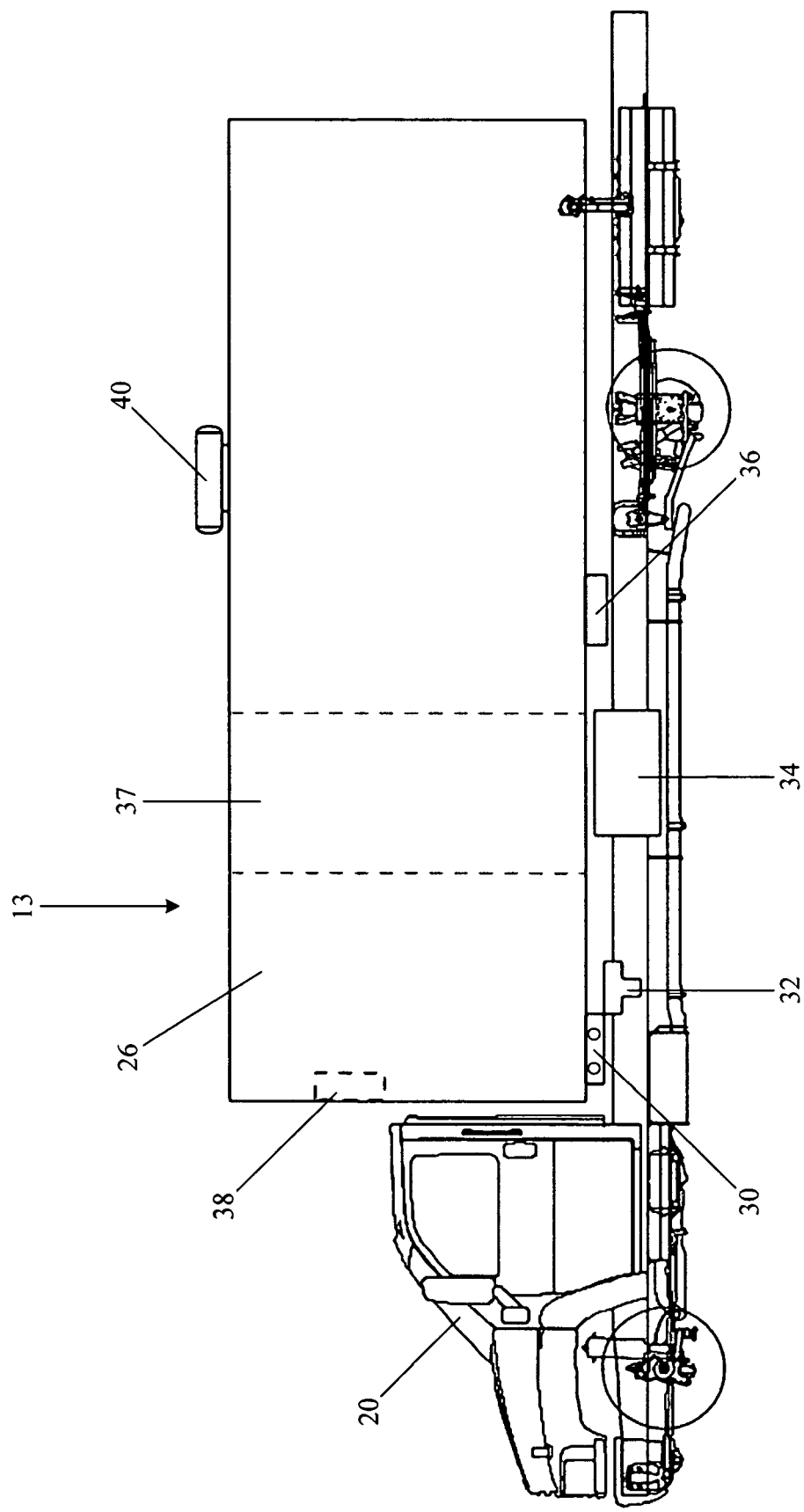
FIG. 2 is a side view of the components mounted on the truck frame of FIG. 1
Figure 3:
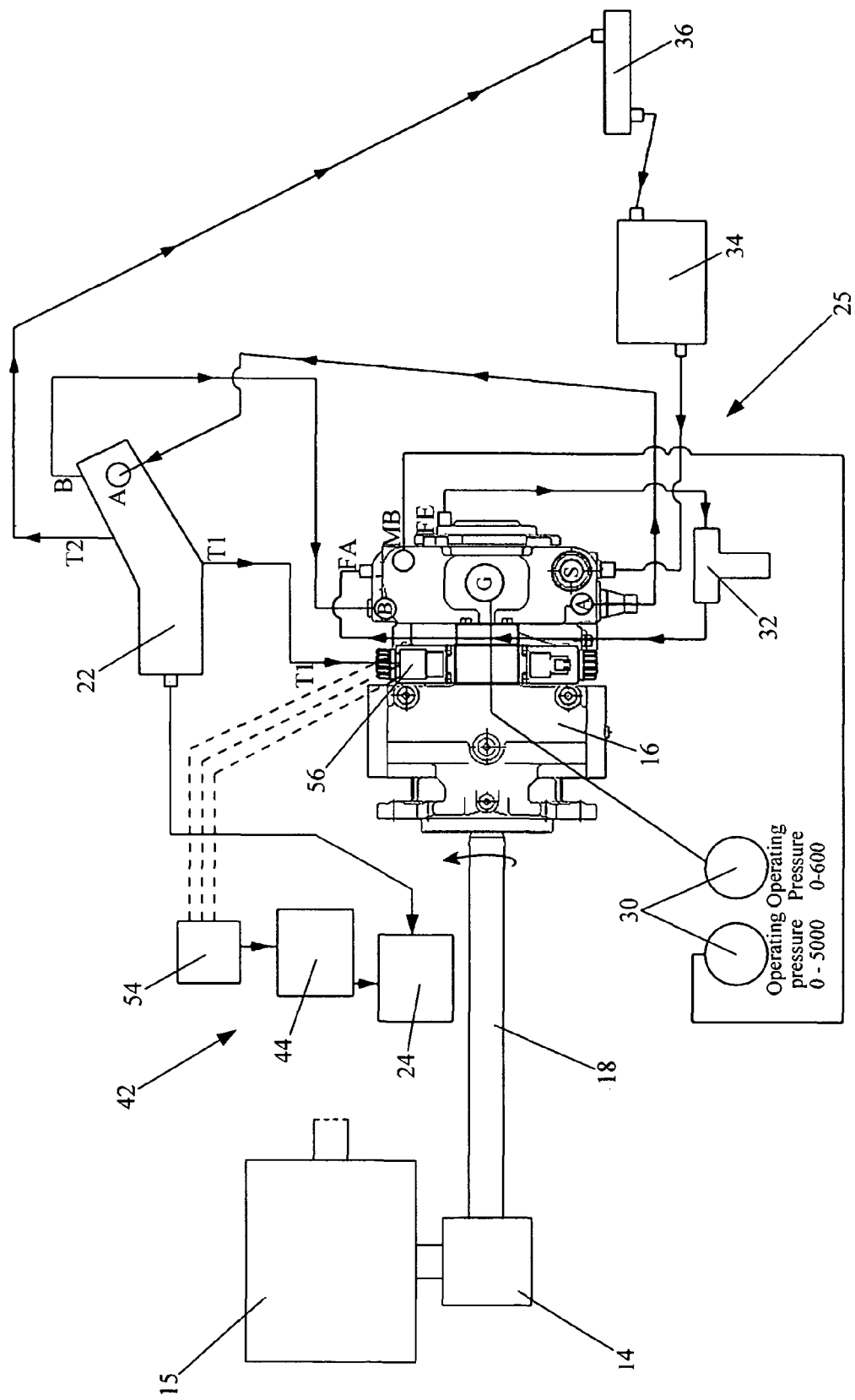
FIG. 3 is a schematic diagram showing the operative connections between the PTO, closed loop hydraulic pump and the generator.

Referring to FIGS. 1 through 6, a truck 13 according to the invention has a frame 10 on which an insulation spraying system 11 and a hydraulic generator system 25 are mounted. A truck box 26 mounted on frame 10 is of conventional design and provides space for the components of spraying system 11 as described below.

Components of the system are installed on truck 13 in a manner that optimizes use of space inside of truck box 26 by mounting components in the cab, under the hood and under the frame as needed. For example, referring to FIG. 6, mounted on the upper right side of a truck engine 92 is an air compressor (VMAC) 28. A set of hoses 17 run from the air compressor (VMAC) 28 to an oil/air separator 74 which is mounted under the driver's side step. Set in the dash of a truck cab 20 is a control console 12 for operating the insulation spraying system 11. Inset in the driver's side wall of a truck box 26 is an entry door 37, permitting access to the interior of the truck box 26. Mounted on the wall to the front of the vehicle in the interior of the truck box 26 is a GSC control box 38 providing user control of the hydraulic generator system 25. Mounted atop of the truck box 26 towards the rear of the vehicle is an AC/Heat conditioning unit 40.

A PTO (Powered Take-Off system) 14 is mounted on an Allison transmission 15 and controlled through the cruise circuit of the engine 92 located on the central underside of the truck cab 20. The PTO 14 is connected to and drives a hydraulic pump 16 through a PTO secondary drive shaft 18, causing the hydraulic pump 16 to turn at a constant speed when engaged by the PTO 14. The hydraulic pump 16 is part of the hydraulic generator system 25, which is located beneath the truck box 26.

Hydraulic pump 16 supplies a constant flow of hydraulic fluid to a hydraulic motor 22 of a generator 24 to maintain the needed 1800 rpm regardless of load condition, providing steady power to the generator 24. The hydraulic fluid is provided by a hydraulic reservoir 34, and remains in a closed loop during operation. While passing through pump 16, the fluid passes through a hydraulic filter 32. After a full revolution, the hydraulic fluid is cooled by a hydraulic air cooler 36 and returns to the reservoir 34.

Figure 5:
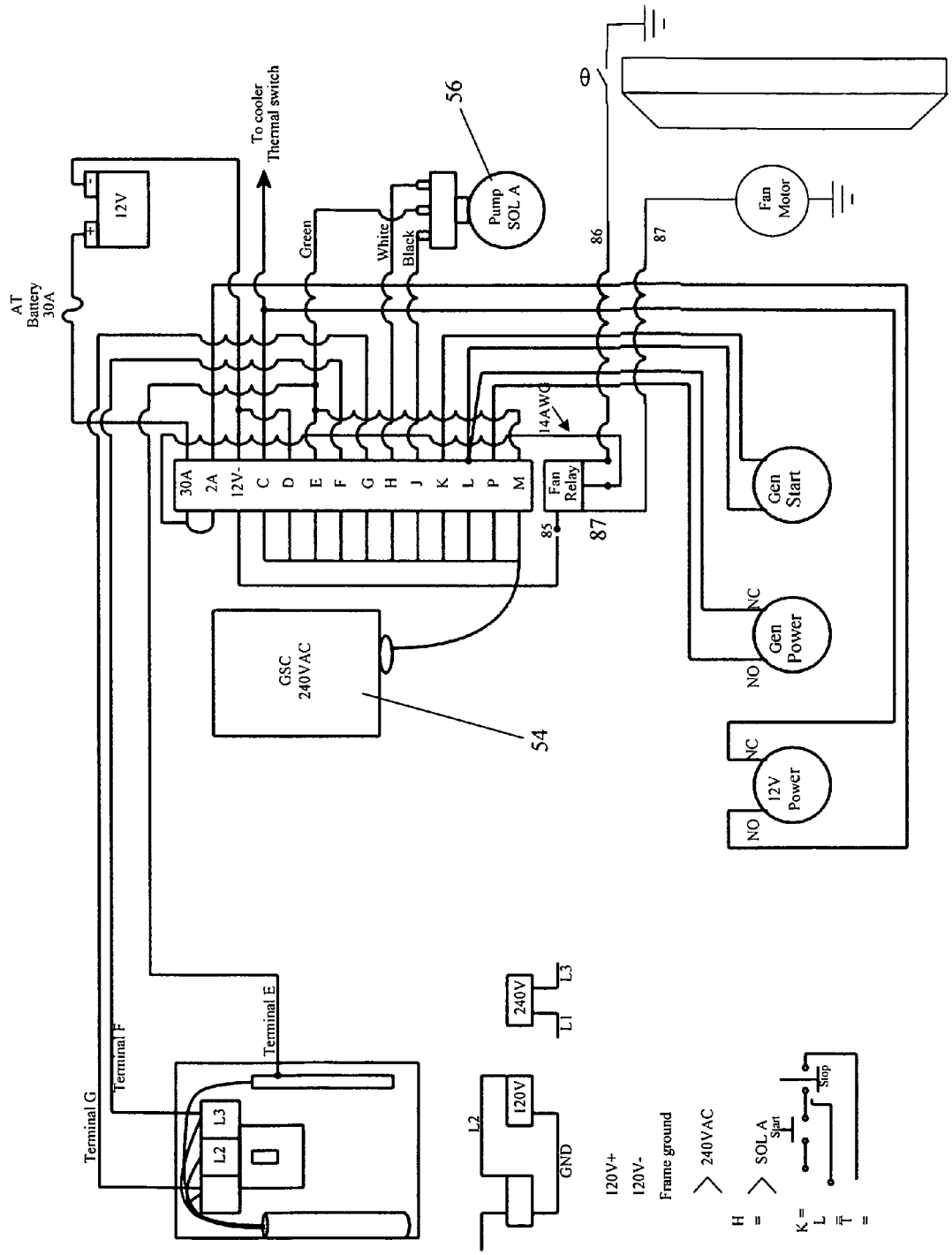
FIG. 5 is a schematic diagram of connections for the hydraulic pump controller according to one example of the invention.

The load on generator 24 fluctuates depending on the number of devices in use at a time. To allow the generator 24 to operate smoothly, a control system 42 regulates power flow to the generator 24. A generator speed controller (GSC) 54 of the control system 42 receives input directly from the generator 24 and monitors changes in voltage. As shown in FIG. 5, the GSC 54 outputs are connected to a solenoid 56 that operates the swash plate of the hydraulic pump 16 to control hydraulic fluid flow. A breaker box 44 acts as a buffer between the GSC 54 and the generator 24 to protect the generator 24 in case of electrical overload. Hydraulic pressures can be viewed by the operator by means of a set of hydraulic gauges 30, which face outwardly from the underside of the truck box 26 towards the driver's side corner for user access.

Figure 4:
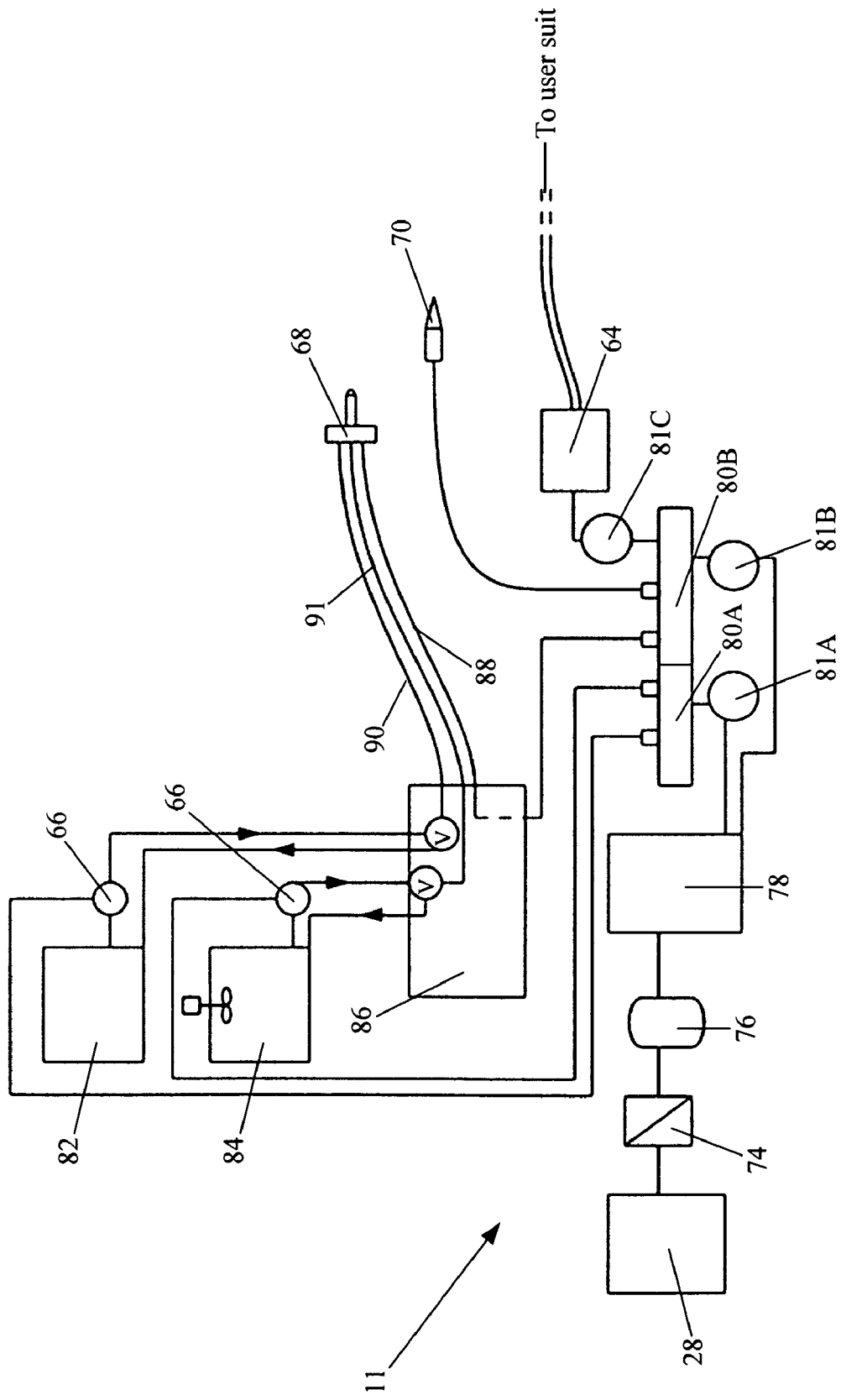
FIG. 4 is a schematic diagram showing the operative connections between the air compressor and generator according to the invention with components of the spray foam installation system.
Figure 6:
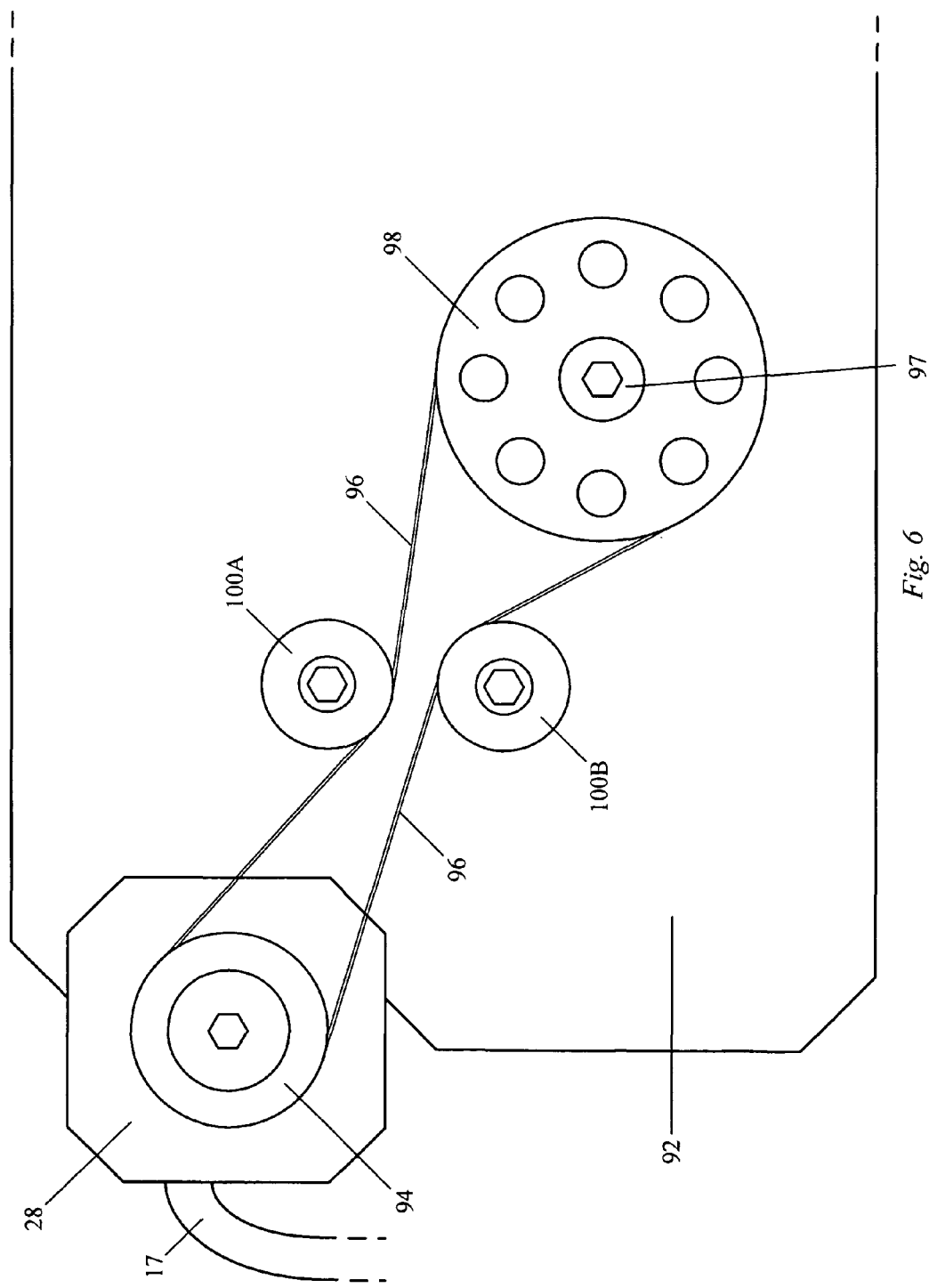
FIG. 6 is a side view of the engine block showing the engine belt drive used to power the air compressor (VMAC).

Referring now to FIG. 4, the insulation spraying system 11 is depicted in schematic form. The air compressor (VMAC) 28 is needed to supply sufficient air for a breathing system 64, a set of chemical pumps 66, a spray gun 68, and a set of air operated knives 70. As shown in FIG. 6, air compressor (VMAC) 28 is on the upper right side of, and is belt driven by, the truck engine 92. Hoses 17 are run from the air compressor (VMAC) 28 to the oil/air separator 74 and then to a tank 76, both of which are located under the driver's side step. After reaching tank 76, the air is fed to an air drier 78 for drying, and then to a set of air distribution manifold compartments 80A and 80B, which distribute the flow of air to the separate subsystems as shown. To feed ready insulation to the spray gun 68, compressed air from air manifold 80A is fed to the chemical pumps 66, which pump insulation reactants from a reactant tank A (82) and a reactant tank B (84), pushing their respective reactant chemicals into an E-30 reactor 86, where the reactants are kept separate and heated. From the E-30 reactor 86, the heated reactants flow to the spray gun 68 through a pair of hoses 90 and 91. At gun 68 they are combined and pressurized to form the ready insulation compound, and finally expelled in the form of foam by means of compressed air from an air hose 88 connected to air manifold compartment 80B. The air manifold compartment 80B also provides air to the air knives 70 and the breathing system 64. Air flow to the manifold compartments from the air drier 78 is controlled by regulators 81A and 81B, while air flow from the manifold compartments to breathing system 64 is controlled by regulator 81C.

Referring now to FIG. 6, the air compressor (VMAC) 28 is mounted on the upper right side of the engine 92, and is engaged and disengaged by an air compressor clutch 94 which is driven by an air compressor belt 96. The air compressor belt 96 is ultimately driven by the engine crankshaft 97 through a crankshaft drive pulley 98, and the connection between the two is secured by a pair of stabilizer pulleys 100A and 100B. Hoses 17 run from the air compressor (VMAC) 28 to the oil/air separator 74 (not shown in FIG. 6).

A motor vehicle according to the invention thus provides a portable, self-contained foam injection system wherein the major powered components are controlled and powered by the vehicle rather than separate stand-alone devices such as a gas-powered electrical generator which would take up space inside of the truck box. If the truck is used only for transporting the components of the foam spray system then a much larger and hence more expensive truck is needed. The present invention remedies this problem while providing control systems that regulate the amount of power from the truck engine that is used to power the spray system components.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. A controller for purposes of the invention may be a single control unit that operates the various components, or two or more controllers that work together as described above. The motor vehicle is preferably a truck but other vehicle types may be suitable, such as RV's and vans. These and other modifications are within the scope of the invention as expressed in the appended claims.

The invention claimed is:

1. A motor vehicle configured to provide an electrical power and a compressed air to a spray foam insulation system, comprising:
   a vehicle including a frame, a cab, a front engine compartment housing an engine which outputs rotary motion to a crankshaft, a drive shaft which propels wheels of the vehicle, a transmission which transmits rotary motion of the crankshaft to the drive shaft, and a truck box behind the cab configured for storing and carrying objects;
   an air compressor mounted in the front engine compartment and connected by a belt and pulley to the crankshaft, including a clutch and a first control system allowing the air compressor to be turned off and on while the engine is running;

an air tank mounted on an exterior of the vehicle and connected to the air compressor, wherein the air tank provides the compressed air to the spray foam insulation system;

a power take off connected to the transmission, including a secondary drive shaft and a second control system for engaging and disengaging the power take off;

a closed-loop hydraulic generator system mounted on the exterior of the vehicle, wherein the closed-loop hydraulic generator system comprises a hydraulic pump connected to and operated by the secondary drive shaft, and a hydraulic motor connected to receive and be driven by a hydraulic fluid from the hydraulic pump;

an electrical generator mounted on the exterior of the vehicle, and connected to receive and be driven by the hydraulic motor, wherein the electrical generator provides the electrical power to the spray foam insulation system; and a controller which receives input indicating electrical power demand on the generator and connected to an actuator on the hydraulic pump, including programmed parameters for operating the hydraulic pump to match flow pressure of the hydraulic pump to the electrical power demand on the generator.

2. The motor vehicle of claim 1, wherein the motor vehicle is a diesel box truck.

3. The motor vehicle of claim 1, wherein the hydraulic pump and generator are mounted to the vehicle frame underneath the truck box.

4. The motor vehicle of claim 1, wherein the controller is mounted within the truck box.

5. The motor vehicle of claim 1, further comprising an air/oil separator mounted on the exterior of the vehicle and connected between the air compressor and the air tank.

6. The motor vehicle of claim 1, further comprising an air dryer mounted on the exterior of the motor vehicle, and connected to the air tank to provide dry, clean compressed air to the spray foam insulation system.

7. The motor vehicle of claim 1, further comprising the spray foam insulation system mounted within the truck box.

8. The motor vehicle of claim 7, wherein the spray foam insulation system comprises:
a first reactant tank;
a first chemical pump connected to the first reactant tank;
a second reactant tank;
a second reactant pump connected to the second reactant tank;
a reactor connected to the first reactant pump and the second reactant pump;
a spray gun connected to the reactor with a two hoses; and
a distribution manifold connected to the air tank to provide compressed air to the first chemical pump, the second chemical pump and the spray gun.

9. The motor vehicle of claim 8, further comprising an air operated knife connected to the distribution manifold.

10. The motor vehicle of claim 9, further comprising a breathing system connected to the distribution manifold.

11. The motor vehicle of claim 1, further comprising a hydraulic reservoir mounted on the exterior of the motor vehicle, and connected to receive the hydraulic fluid from the hydraulic motor and provide the hydraulic fluid to the hydraulic pump.

12. The motor vehicle of claim 1, further comprising a hydraulic air cooler mounted on the exterior of the motor vehicle, and connected to receive and cool the hydraulic fluid from the hydraulic motor and provide the hydraulic fluid to the hydraulic pump.

13. The motor vehicle of claim 1, further comprising one or more hydraulic gauges mounted on the exterior of the motor vehicle and connected to the closed-loop hydraulic generator system.

14. The motor vehicle of claim 1, further comprising an AC/Heat conditioning unit mounted on top of the truck box for heating and cooling an interior of the truck box.

15. A motor vehicle configured to provide an electrical power and a compressed air to a spray foam insulation system, comprising:
a vehicle including a frame, a cab, a front engine compartment housing an engine which outputs rotary motion to a crankshaft, a drive shaft which propels wheels of the vehicle, a transmission which transmits rotary motion of the crankshaft to the drive shaft, and a truck box behind the cab configured for storing and carrying objects;

an air/oil separator mounted on the exterior of the vehicle and connected between the air compressor and the air tank.

an air compressor mounted in the front engine compartment and connected by a belt and pulley to the crankshaft, including a clutch and a first control system allowing the air compressor to be turned off and on while the engine is running;

an air tank mounted on an exterior of the vehicle and connected to the air compressor, wherein the air tank provides the compressed air to the spray foam insulation system;

a power take off connected to the transmission, including a secondary drive shaft and a second control system for engaging and disengaging the power take off;

a closed-loop hydraulic generator system mounted on the exterior of the vehicle, wherein the closed-loop hydraulic generator system comprises a hydraulic pump connected to and operated by the secondary drive shaft, a hydraulic motor connected to receive and be driven by a hydraulic fluid from the hydraulic pump, a hydraulic air cooler connected to receive and cool the hydraulic fluid from the hydraulic motor, and a hydraulic reservoir connected to receive the hydraulic fluid from the hydraulic air cooler and provide the hydraulic fluid to the hydraulic pump;

an electrical generator mounted on the exterior of the vehicle, and connected to receive and be driven by the hydraulic motor, wherein the electrical generator provides the electrical power to the spray foam insulation system; and a controller which receives input indicating electrical power demand on the generator and connected to an actuator on the hydraulic pump, including programmed parameters for operating the hydraulic pump to match flow pressure of the hydraulic pump to the electrical power demand on the generator.

16. The motor vehicle of claim 15, wherein the hydraulic pump and generator are mounted to the vehicle frame underneath the truck box.

17. The motor vehicle of claim 1, wherein the controller is mounted within the truck box.

18. The motor vehicle of claim 1, further comprising an air dryer mounted on the exterior of the motor vehicle, and connected to the air tank to provide dry, clean compressed air to the spray foam insulation system.

19. The motor vehicle of claim 1, further comprising the spray foam insulation system mounted within the truck box.

20. The motor vehicle of claim 7, wherein the spray foam insulation system comprises:
a first reactant tank;
a first chemical pump connected to the first reactant tank;
a second reactant tank;
a second reactant pump connected to the second reactant tank;
a reactor connected to the first reactant pump and the second reactant pump;
a spray gun connected to the reactor with a two hoses; and
a distribution manifold connected to the air tank to provide compressed air to the first chemical pump, the second chemical pump and the spray gun.

* * * * *